W. H. LARCH.
GRAIN BIN.
APPLICATION FILED MAY 25, 1911.

1,005,983.

Patented Oct. 17, 1911.

WITNESSES
F. C. Barry

INVENTOR
William H. Larch
BY
Attorneys

UNITED STATES PATENT OFFICE.

WILLIAM H. LARCH, OF TAB, INDIANA.

GRAIN-BIN.

1,005,983. Specification of Letters Patent. Patented Oct. 17, 1911.

Application filed May 25, 1911. Serial No. 629,395.

*To all whom it may concern:*

Be it known that I, WILLIAM H. LARCH, a citizen of the United States, residing at Tab, in the county of Warren and State of Indiana, have invented certain new and useful Improvements in Grain-Bins, of which the following is a specification.

This invention has for its object to provide a ventilating device for grain bins whereby the bin may be changed from a tight bin for wheat and other small grain, to a ventilated bin for ear corn.

Small grain is usually delivered before corn gathering time, so that by employing the herein-described ventilating device, the bin, after it is emptied of the wheat or other small grain, can be used for storing ear corn, thus saving the expense of a slatted corn crib.

With the herein stated object in view, the invention consists in a novel construction and arrangement of parts to be hereinafter described and claimed, reference being had to the accompanying drawing forming a part of this specification, in which drawing—

Figure 1:
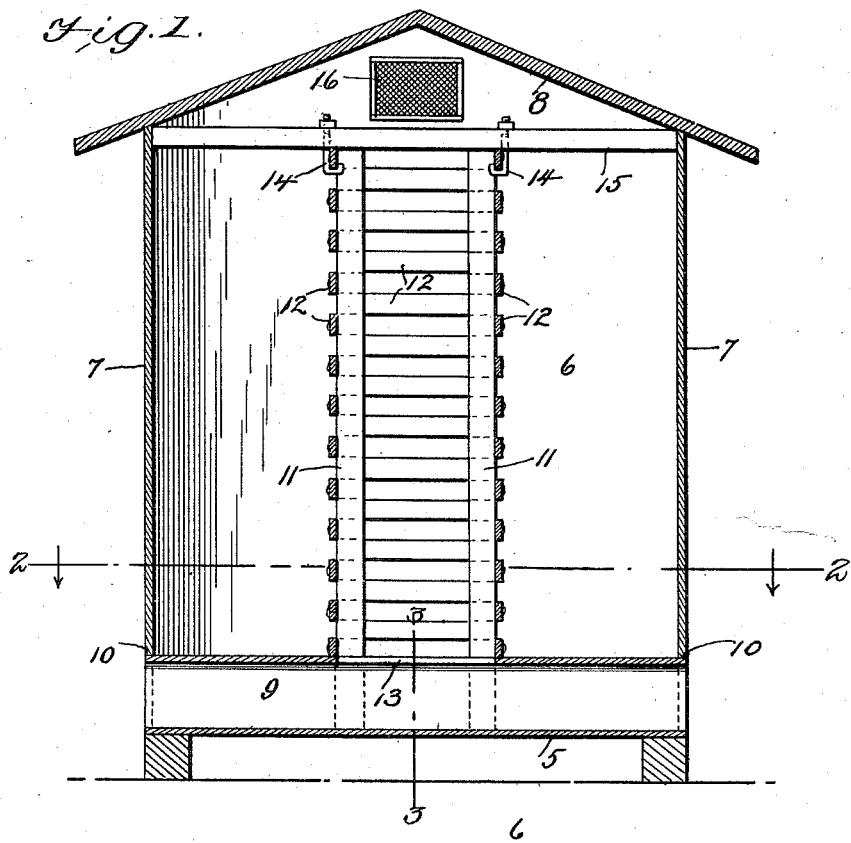
Figure 2:
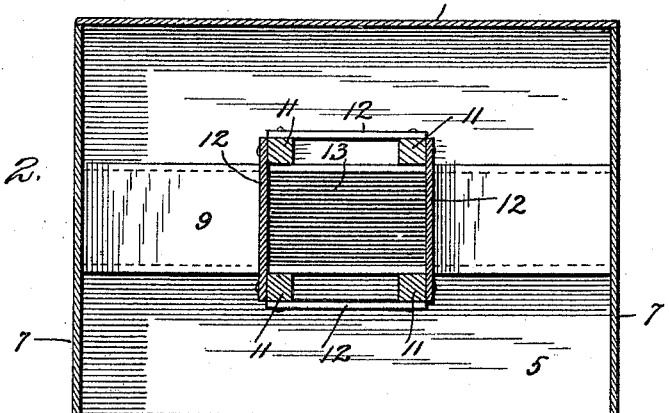
Figure 3:
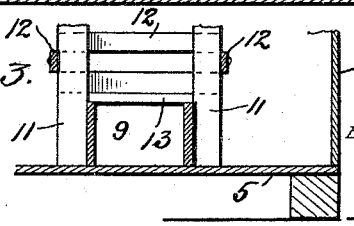

Figure 1 is a longitudinal section of the bin and the ventilating device. Fig. 2 is a horizontal section on the line 2—2 of Fig. 1. Fig. 3 is a transverse section on the line 3—3 of Fig. 1.

Referring specifically to the drawing, the bin comprises a floor 5 supported in any suitable manner a short distance from the ground, side and end walls 6 and 7, respectively, and a roof 8. This structure is built in the ordinary manner, and forms a tight bin for holding wheat or other small grain.

The ventilating device comprises a horizontal flue 9 running across the floor of the bin from one end thereof to the other. The flue is fitted at its ends into openings 10 made in the end walls 7 of the bin, and it is open at both ends so that air may circulate therethrough. The flue is removably mounted on the floor of the bin so that it may be taken out when the bin is to be used for storing small grain, in which event the openings 10 will be suitably closed up. Within the bin is also located a vertical flue which is a slatted structure composed of four corner posts 11, across which are nailed slats 12, which latter are spaced apart. This vertical flue straddles the horizontal flue over an opening 13 made in the top wall of the latter, two of the corner posts being on one side of the horizontal flue, and the other two posts on the other side of said flue, as clearly shown in Fig. 2 of the drawing. The bottom slats on two sides of the vertical flue extend across and are supported by the top wall of the horizontal flue. The vertical flue sits loosely on the horizontal flue, from which latter it rises to a suitable height, and it is held in place by means of hook bolts 14 secured to one of the roof rafters 15, which bolts, upon being removed, permit the flue to be taken out of the bin for the same purpose as the horizontal flue. Near the roof of the bin, the side walls 6 have screened ventilating openings 16.

When the flues herein described are in position within the bin, the air currents passing through the horizontal flue escape through the opening 13 into the vertical flue, and upon passing upwardly therein escape through the spaces between the slats 12. The air therefore circulates through the corn, and keeps the same dry and in good condition. Any shelled corn dropping down the vertical flue into the horizontal flue can be readily removed from the latter by a suitable scraper. If the bin is to be used for holding wheat or other small grain, the two flues will be removed as described.

The drawing shows only one vertical flue, but it will be understood that any number of flues can be employed, the number depending on the size of the bin.

I claim:

The combination with a grain bin, of a removable horizontal flue extending across the floor thereof and opening through opposite walls of the bin, the top wall of the flue having an opening, and a vertical flue located over the opening of the horizontal flue, said vertical flue comprising corner posts loosely supported on the floor and arranged in pairs on opposite sides of the horizontal flue, and spaced slats secured to the posts, the bottom slats of said vertical flue extending across and being loosely supported by the top wall of the horizontal flue.

In testimony whereof I affix my signature in presence of two witnesses.

WILLIAM H. LARCH.

Witnesses:
ELSWORTH NORRIS,
HARRY GREEN.

---

Copies of this patent may be obtained for five cents each, by addressing the "Commissioner of Patents, Washington, D. C."